US011607963B2

(12) United States Patent
Andre et al.

(10) Patent No.: US 11,607,963 B2
(45) Date of Patent: Mar. 21, 2023

(54) METHOD FOR IMPEDANCE-CONTROLLED FAST CHARGING, CONTROL UNIT FOR A CHARGING SYSTEM, STORED ENERGY SOURCE, AND WORKING DEVICE

(71) Applicant: Bayerische Motoren Werke Aktiengesellschaft, Munich (DE)

(72) Inventors: Dave Andre, Munich (DE); Christoph Bauer, Herrsching (DE); Simon Nuernberger, Bad Aibling (DE); Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 17/251,664

(22) PCT Filed: May 14, 2019

(86) PCT No.: PCT/EP2019/062348
§ 371 (c)(1),
(2) Date: Dec. 11, 2020

(87) PCT Pub. No.: WO2019/238337
PCT Pub. Date: Dec. 19, 2019

(65) Prior Publication Data
US 2021/0276434 A1 Sep. 9, 2021

(30) Foreign Application Priority Data
Jun. 13, 2018 (DE) ..................... 10 2018 209 461.6

(51) Int. Cl.
*B60L 53/10* (2019.01)
*B60L 58/27* (2019.01)
*B60L 53/62* (2019.01)

(52) U.S. Cl.
CPC .............. *B60L 53/11* (2019.02); *B60L 53/62* (2019.02); *B60L 58/27* (2019.02)

(58) Field of Classification Search
CPC .......... B60L 53/11; B60L 53/62; B60L 58/27; B60L 2240/547; B60L 2240/549;
(Continued)

(56) References Cited

U.S. PATENT DOCUMENTS

2006/0017444 A1   1/2006   Fechalos et al.
2010/0060240 A1   3/2010   Karoui et al.
(Continued)

FOREIGN PATENT DOCUMENTS

DE        103 37 064 A1      12/2004
DE   10 2013 206 612 A1      10/2014
(Continued)

OTHER PUBLICATIONS

Taniguchi et al., "A Method for Identifying the Full Charging Point and the Degree of Deterioration of Lead-Acid Batteries," Intelec 2000. 22nd, International Telecommunications Energy Conference, Sep. 10, 2000, pp. 609-614, XP000968745 (six (6) pages).
(Continued)

*Primary Examiner* — Paul Dinh
(74) *Attorney, Agent, or Firm* — Crowell & Moring LLP

(57) ABSTRACT

A method is provided for impedance-controlled fast charging of a stored electrical energy source of a working device, in particular of a stored energy source in a vehicle. In the method: a variable characteristic of an impedance of the stored energy source is detected; a present charging current for charging the stored electrical energy source is set as a function of the variable characteristic of the impedance; the present charging current is temporarily reduced with a steep edge by temporarily connecting a resistive load to the stored energy source and feeding the load using the stored energy (Continued)

source; and a voltage response of the stored energy source to the steep edge is detected as the variable characteristic of the impedance of the stored energy source and is used as the basis for setting the present charging current.

16 Claims, 3 Drawing Sheets

(58) Field of Classification Search
CPC .... B60L 2240/80; B60L 58/10; H02J 7/0013; H02J 7/00711; H02J 7/00712; H02J 7/34; H02J 2310/48; Y02T 10/70; Y02T 10/7072; Y02T 90/12; Y02T 90/14; Y02T 10/62; B60Y 2200/91; B60Y 2200/92; Y04S 10/126
USPC .......................................................... 320/137
See application file for complete search history.

(56) References Cited

U.S. PATENT DOCUMENTS

| | | |
|---|---|---|
| 2011/0221392 A1 | 9/2011 | Gale et al. |
| 2013/0009608 A1 | 1/2013 | Nieberlein et al. |
| 2013/0241568 A1 | 9/2013 | Covasala |
| 2015/0258907 A1 | 9/2015 | Lee |
| 2016/0149430 A1 | 5/2016 | Hempel et al. |
| 2018/0321326 A1 | 11/2018 | Tanaka et al. |
| 2021/0009006 A1* | 1/2021 | Gaze ........................ B60L 53/62 |
| 2021/0203177 A1* | 7/2021 | Peng ........................ B60L 53/63 |

FOREIGN PATENT DOCUMENTS

| | | |
|---|---|---|
| DE | 10 2013 105 119 A1 | 12/2014 |
| DE | 10 2015 103 561 A1 | 9/2015 |
| DE | 10 2015 111 195 A1 | 1/2017 |
| DE | 11 2016 002 873 T5 | 3/2018 |
| EP | 0 181 112 A2 | 5/1986 |
| EP | 0 399 821 A2 | 11/1990 |
| EP | 0 544 121 A1 | 6/1993 |
| EP | 2 239 826 A1 | 10/2010 |
| EP | 2 629 107 A1 | 8/2013 |
| EP | 2 550 701 B1 | 10/2015 |
| WO | WO 2008/065273 A2 | 6/2008 |

OTHER PUBLICATIONS

International Search Report (PCT/ISA/210) issued in PCT Application No. PCT/EP2019/062348 dated Jul. 18, 2019 with English translation (seven (7) pages).
German-language Written Opinion (PCT/ISA/237) issued in PCT Application No. PCT/EP2019/062348 dated Jul. 18, 2019 (eight (8) pages).
German-language Search Report issued in German Application No. 10 2018 209 461.6 dated Mar. 15, 2019 with partial English translation (11 pages).
Cover sheet of EP 2 087 574 A2 published on Aug. 12, 2009 (one (1) page).

\* cited by examiner

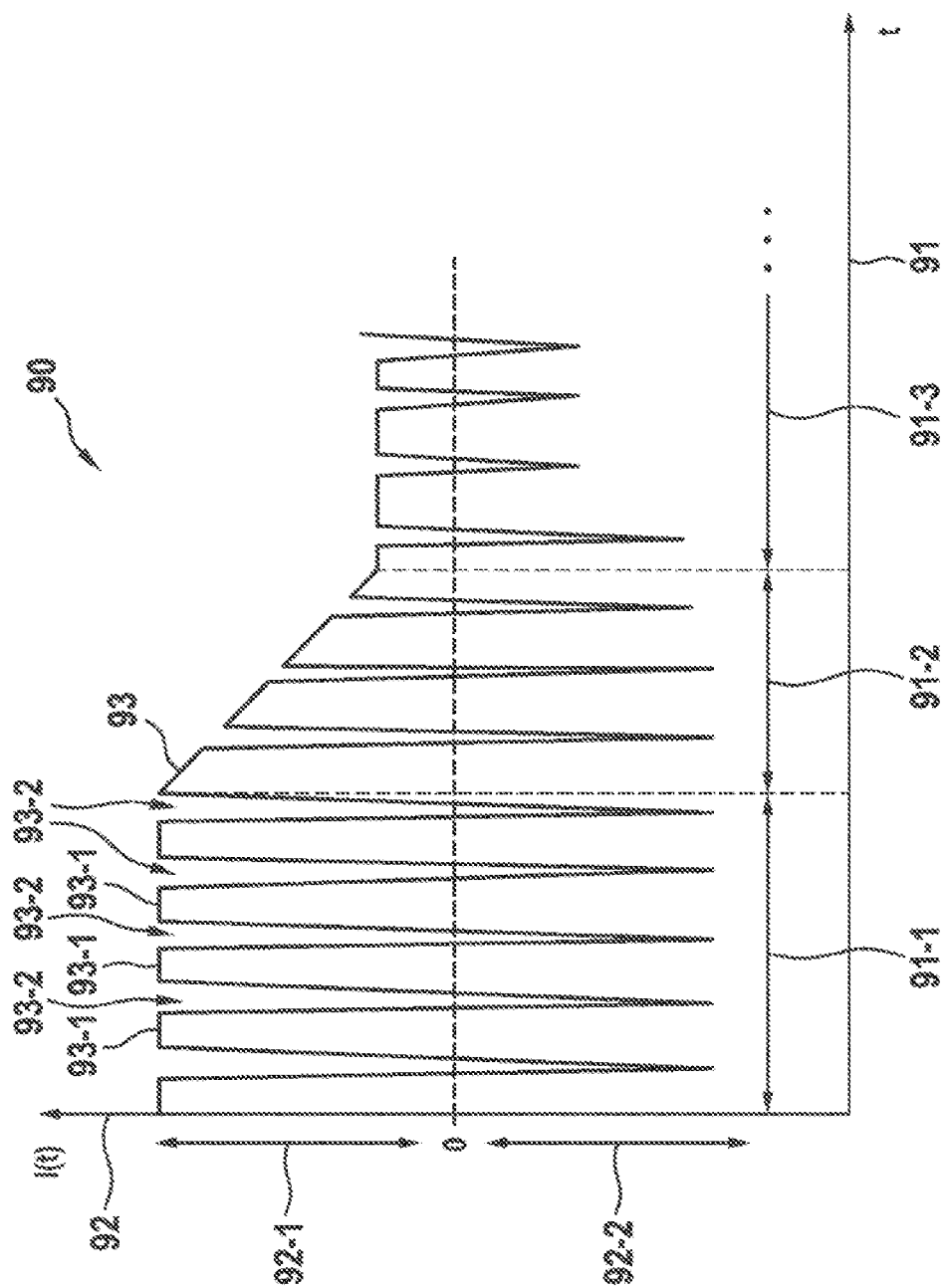

METHOD FOR IMPEDANCE-CONTROLLED FAST CHARGING, CONTROL UNIT FOR A CHARGING SYSTEM, STORED ENERGY SOURCE, AND WORKING DEVICE

BACKGROUND AND SUMMARY OF THE INVENTION

The invention relates to a method for impedance-controlled fast charging of an electrical energy store of a working device, a control unit for a charging system, an energy store and a working device.

Working devices, and particularly vehicles, are increasingly operated by means of electrical energy stores, either exclusively, for example in the case of an electric car or BEV, or by way of a hybrid system. For the charging of the energy store of the working device, charging stations are generally employed, which are designed entirely for the fast charging of the energy store and are configured, for example, in the form of charging columns for electric vehicles or hybrid vehicles. A problematic issue in charging stations of this type is the absence of a facility for the generation and output of discharge pulses, on the basis of which characteristic variables for an impedance or an internal resistance of the energy store can be deduced, and an impedance-dependent charging current setting can be executed.

The fundamental object of the invention is the disclosure of a method for the impedance-controlled fast charging of an electrical energy store, a control unit for a charging system, an energy store and a working device, particularly a vehicle, by means of which, independently of the insufficiencies of a fundamental charging station, using simple means, an impedance-controlled fast charging of a fundamental electrical energy store is possible.

The fundamental object of the invention is fulfilled by a method for impedance-controlled fast charging, by a control unit, by a charging system, by an energy store, and by a working device, in accordance with the claimed invention. Advantageous further developments are the subject matter of respective dependent claims.

According to a first aspect of the present invention, a method is provided for the impedance-controlled fast charging of an electrical energy store of a working device, particularly a vehicle energy store of a vehicle, wherein:

(i) a characteristic variable for an impedance of the energy store is detected, (ii) a present charging current for charging the electrical energy store is set as a function of the characteristic variable for impedance, (iii) by the temporary connection and supply of an ohmic load from the energy store, the present charging current is temporarily reduced with a steep ramp, particularly in excess of 20 A/s, preferably within the range of approximately 1 A/ms to approximately 50 A/ms, and (iv) a voltage response of the energy store to the steep ramp is detected as a characteristic variable for the impedance of the energy store, and is employed as a basis for the setting of the present charging current.

By means of this measure it is possible, regardless of the facilities of a charging station, to detect a characteristic variable for the impedance of the energy store, thus permitting the impedance-dependent control or regulation of the charging process.

Particularly advantageously, the method according to the invention is then employable if a heating device is employed as an ohmic load and, for the reduction of the present charging current, is connected to the energy store, for the operation of the heating device. In this case, energy employed for the reduction of the present charging current can be advantageously converted by the generation of a quantity of heat.

This is particularly advantageous if, by way of a heating device, a dedicated heating device of the energy store, and particularly a battery-specific or cell-specific heating device is employed on or in the energy store, and particularly on or in a battery or cell, particularly in the manner of a sheet heating element. In this case, the heating device is thus in close spatial proximity to the energy store, such that the quantity of heat generated is evacuated to the latter. In this manner, for example, an appropriate operating temperature of the energy store can be achieved or maintained.

In principle, however, any ohmic loads, or other loads, can be employed, provided that they permit a temporary reduction of the present charging current, thus allowing the determination of a characteristic variable for the impedance of the energy store.

Alternatively or additionally, it is also conceivable that, by way of an ohmic load, a generator or electrical machine of the fundamental working device is employed, particularly in an active short-circuit state.

A particularly elegant solution is provided if, by way of an ohmic load, a further energy store which is to be charged is employed, particularly in a DC/DC coupling arrangement with the fundamental energy store.

According to the invention, charging of the energy store can be executed locally and/or decentrally for the fundamental energy store.

Alternatively or additionally, it is conceivable that the charging of the energy store, in combination with the fundamental energy store, is centrally controlled or regulated for a plurality of energy stores.

A particularly high degree of flexibility is achieved if, according to another advantageous form of embodiment of the method according to the invention, the charging of a plurality of energy stores is controlled or regulated, wherein:

detection of a voltage response of a fundamental or respective energy store is executed locally and/or decentrally, an evaluation and/or appraisal of the voltage responses of a plurality of energy stores is executed centrally, and/or a common charging strategy is selected for a plurality of energy stores on the basis of an energy store having the lowest impedance of all the energy stores.

It is moreover conceivable that the temporary reduction of the charging current is executed:

particularly for diagnostic purposes, at a frequency within the range of approximately 0.1 Hz to approximately 10 Hz, preferably in the region of approximately 1 Hz, in the manner of a discharge pulse, having a pulse duration in a low-frequency component with a length of approximately 1 second, having a discharge time of 5 ms, having a control response to a decaying charging current of 995 ms and/or having a pulse duration in a high-frequency component within the range of approximately 5 ms to approximately 10 ms; and/or, particularly for standardized intercalation, at a frequency within the range of approximately 50 Hz to approximately 200 Hz and/or at a scanning rate of 10%.

According to a further aspect of the present invention, a control unit for a charging system is also provided, which is designed, in a fundamental charging system, to execute, permit the execution of and/or control a method according to the invention for the impedance-controlled fast charging of an electrical energy store.

In a preferred exemplary embodiment of the control unit according to the invention, the latter is configured as a control chip and/or an ASIC on or in a fundamental energy store, particularly a battery cell, a module or a module housing, or on or in a region of a battery cell, a module or a module housing.

The control unit according to the invention can moreover be configured centrally or decentrally, for one or more energy stores, or parts thereof, for one or more battery cells, or parts thereof, for one or more modules, or parts thereof, for local or centralized measurement and/or for local or centralized evaluation and/or control.

The present invention further provides a charging system for the impedance-controlled fast charging of an electrical energy store of a working device, and particularly of a vehicle energy store of a vehicle.

The charging system according to the invention is designed to be employed, operated or controlled with, or for the purpose of a method for impedance-controlled fast charging according to the present invention.

The charging system according to the invention is advantageously configured with a control unit according to the present invention.

A further aspect of the present invention comprises the provision of an energy store, particularly a vehicle energy store, having a control unit which is configured according to the invention, or having a terminal for a control unit which is configured according to the invention.

The energy store according to the invention thus comprises, for example, an ohmic load or a terminal for the controllably switchable connection of an ohmic load.

According to a further concept of the present invention, a working device is envisaged, having an energy store and a control unit.

The control unit and/or the energy store can be configured according to the invention.

Alternatively or additionally, the energy store can incorporate a control unit which is configured according to the invention.

Further details, features and advantages of the invention proceed from the following description and the figures.

BRIEF DESCRIPTION OF THE DRAWINGS

FIG. 3 illustrates, by reference to a graph incorporating a charging curve, a charging strategy which can be generated by means of one form of embodiment of the method according to the invention.

DETAILED DESCRIPTION OF THE DRAWINGS

Exemplary embodiments and the technical background to the invention are described in detail hereinafter, with reference to FIGS. 1 to 3. Identical and equivalent, together with identically and equivalently acting elements and components are identified by the same reference symbols. The detailed description of the elements and components identified is not repeated in every instance of their occurrence.

The features represented, and further properties, can be isolated from one another in an arbitrary manner, and can be mutually combined in an arbitrary manner, without departing from the core of the invention.

Figure 1:
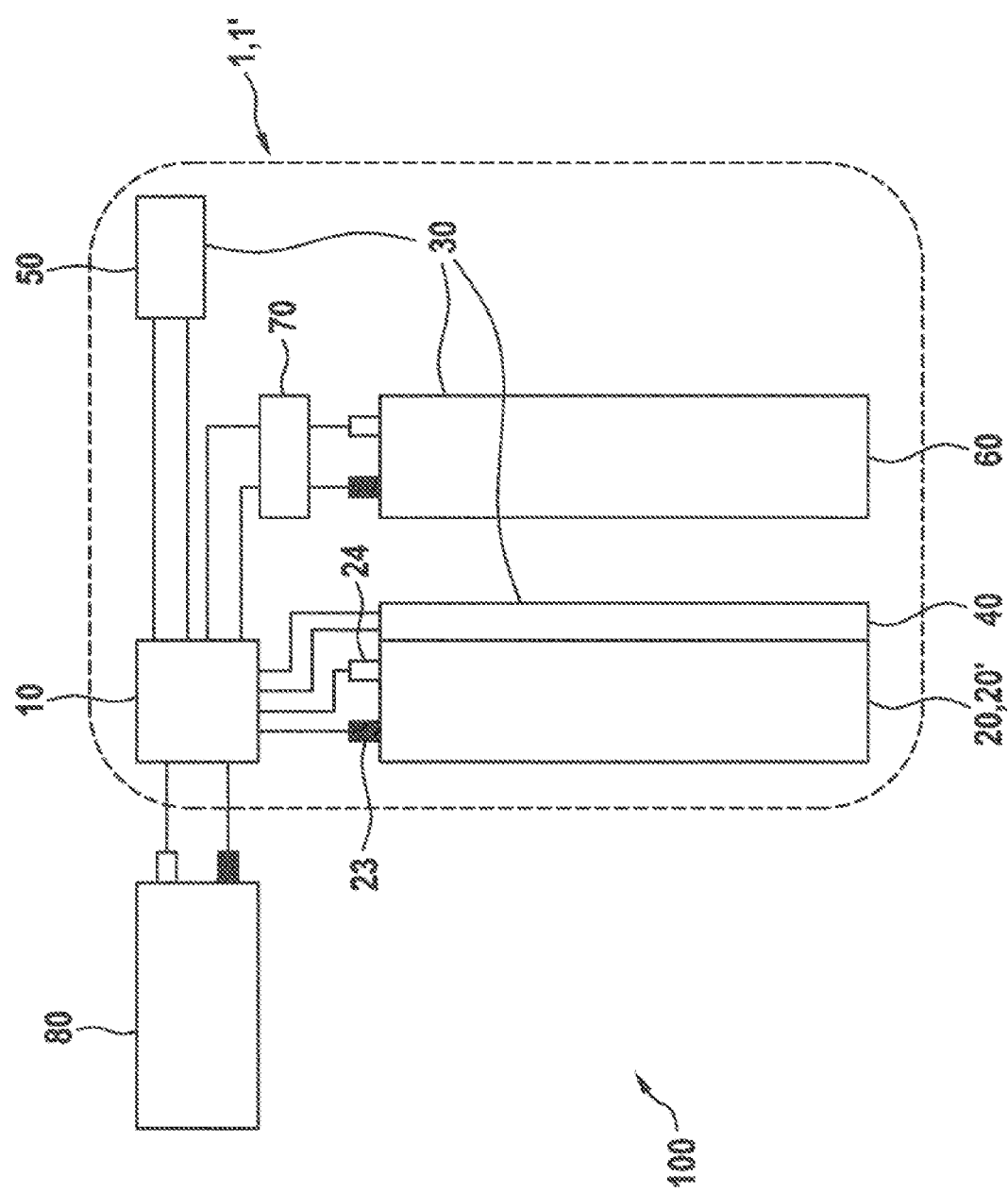
FIG. 1 represents, in the form of a schematic block diagram, the structure of one form of embodiment of a charging system according to the invention, with a working device which is configured according to the invention.

FIG. 1 represents, in the form of a schematic block diagram, the structure of one form of embodiment of a charging system 100, with a working device 1 which is configured accordingly.

The charging system 100 according to FIG. 1 comprises a working device 1, for example in the form of a vehicle 1', in which an electrical energy store 20 is configured, in this case in the form of a vehicle energy store 20', in order to supply in-service units of the working device 1 with energy. Moreover, for the charging of the energy store 20, a charging unit 80 is configured, which is controllably connectable to the terminals 23 and 24 of the energy store.

For the control of the charging process, particularly in the manner according to the invention, a control unit 10 is provided. This can be configured in the form of components on or in the energy store 20 wherein, however, in the case represented in FIG. 1, the control unit is arranged separately from the energy store 20.

The control unit 10 is designed to initiate, execute and/or control a method for the impedance-controlled fast charging of the energy store 20.

To this end, the control unit 10 is capable, during a charging process, of the temporary connection of a specified ohmic load 30, or a general load, to the energy store 20 such that, during the connection of the load 30 to the energy store 20, the charging current in the energy store 20 reduces, wherein the reduction occurs with a comparatively steep ramp in excess of 20 A/s, such that this abrupt drop can be employed for an impedance analysis or similar, namely, by the detection of a corresponding voltage response of the energy store 20, optionally with evaluation.

In the form of embodiment represented in FIG. 1, various loads 30 are indicated, namely, a heating device 40 which is arranged in the immediate spatial vicinity of the energy store 20, for example in the form of a sheet heating element, a further energy store 60, which is electrically connectable to the fundamental energy store 20 by means of a DC/DC coupling, and a generator 50 which, in active short-circuit operation, can also function as a load 30.

Figure 2:
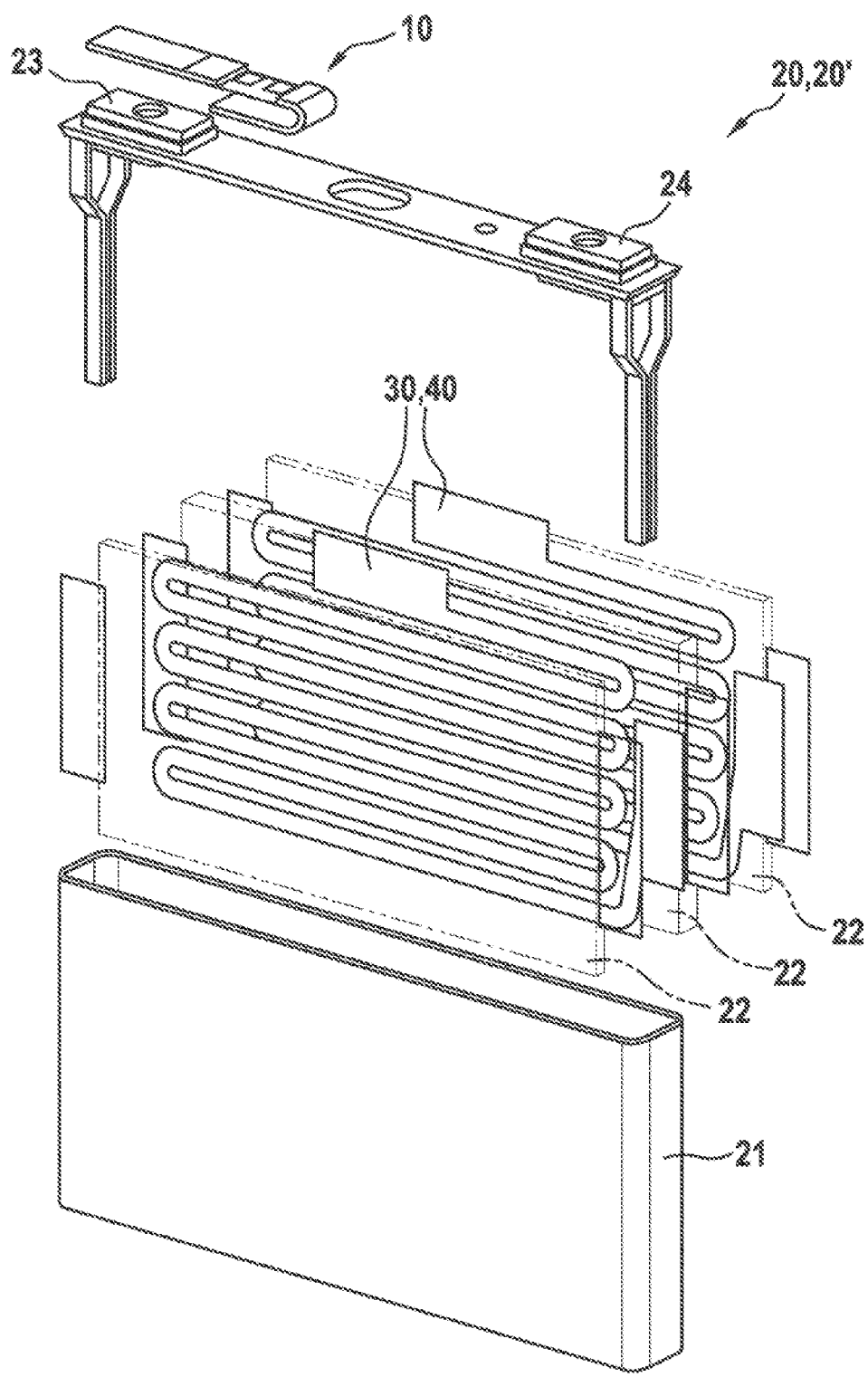
FIG. 2 represents, in the form of an exploded perspective diagram, one form of embodiment of an energy store which is configured according to the invention, particularly in the form of a cell.

FIG. 2 represents, in the form of an exploded perspective diagram, one form of embodiment of an energy store 20 which is configured according to the invention, in the form of a vehicle energy store 20', particularly in the form of a cell.

In this form of embodiment of the energy store 20 as a vehicle energy store 20', the heating device 40 is configured in the form of a sheet heating element in the housing 21, and is arranged between the electrode stacks 22. In the region of the terminals 23 and 24 of the energy store 20, the control unit 10, with corresponding switching units, is configured. However, this arrangement is not mandatory, but is indicated for exemplary purposes only.

By reference to a graph 90 having a charging curve 93, FIG. 3 illustrates a charging strategy which can be generated by means of one form of embodiment of the method according to the invention.

Time is plotted on the x-axis 91 of the graph 90, and the present charging current I(t) is plotted on the y-axis 92.

It can be seen that the charging curve 93 comprises a high charging phase 91-1, having corresponding charging segments or charging pulses 93-1 with comparatively high and constant values for the charging current I(t). This is followed by an intermediate charging phase 91-2 or transitional charging phase, in which the value of the charging current I(t)—particularly, but not necessarily, in a linear manner—reduces over time, terminating in a low charging phase 91-3, with comparatively low and constant values for the charging current I(t).

Between the individual charging segments 93-1 or charging pulses, temporary and, in comparison with the charging segments 93-1, short-term discharge pulses or discharge segments 93-2 occur, which assume a steeply falling ramp for the characteristic of the value of the charging current I(t). These discharge pulses 93-2, having a steeply falling ramp, can be employed, for example, for the detection and evaluation of a resulting voltage response of the energy store 20, namely, for the deduction of a characteristic variable for the impedance of the energy store 20. In the simplest case, this can be a variable which directly describes the corresponding voltage drop across the energy store.

The respective ramp characteristic can extend from the charging regime 92-1 on the y-axis 92 via the value zero into the discharging regime 92-2; however, this is not mandatory—a drop which proceeds within the charging regime 92-1 is sufficient for the execution of the concept according to the invention.

This feature, and further features and properties of the present invention, are described in greater detail with reference to the following considerations:

Fast charging of an energy store by means of a CCCV method (CCCV: constant current, constant voltage) or by means of a multi-step method (MSCC: multi-step, constant current) in an impedance-controlled manner is possible in mobile terminal devices having only a lithium-ion cell. In order to determine variations in impedance, current variations—for example within the range of a few Hz or a few 100 Hz up to the kHz range—for example having pulse widths in the range of a few milliseconds, for example 1 ms to 10 ms—and/or with a switchover from charging to discharging, are imposed, and the voltage response is measured.

In an electric vehicle 1' or a hybrid vehicle—described in summary as a working device 1—by means of the charging column—described in summary as a charging unit 80—no such current variations are generated, as a charging column of this type can only charge, but cannot discharge the energy store of a corresponding vehicle.

Moreover, a current ramp or edge which can be generated by means of charging columns 80 is limited to a value of 20 A/s. This is not sufficient for the deduction of a characteristic variable for the impedance of an energy store 20.

By means of the application according to the invention, and particularly by the integration of one or more sheet heating elements 40 or general ohmic loads 30 in a cell of an energy store of a working device 1, particularly of a vehicle 1', during an ongoing fast charging process, discharging can also be executed by means of the cell by the load 30 being connected. By the connection of the ohmic load 30, discharge currents are generated and/or current is reduced to the requisite degree.

Any switching elements employed must be capable of switching in a sufficiently rapid manner, for example within the range of a few Hz or a few 100 Hz up to the kHz range, for example having pulse widths in the range of a few milliseconds, for example 1 ms to 10 ms. Insofar as possible, switching must also be executed in a cell-specific manner, or must be feasible per module or per high-voltage battery. The switching elements must also be rated with a corresponding current-carrying capacity.

However, by the measures according to the invention, a measurement of impedance, for example by means of a chip or an ASIC—described in summary as a control unit 10 according to the invention—can be executed in proximity to the cell or, in general, on the energy store 20.

The chip or ASIC, by way of a control unit 10, can also control the necessary switches and/or can incorporate or constitute the latter.

As the "discharge pulses" are only of a short duration, the input of heat to the ohmic loads 30, and particularly to the sheet heating element 40, is comparatively low.

The rating of the value of the ohmic resistance of the ohmic load 30 vis-à-vis the cell resistance can be dimensioned such that, in the event of simultaneous charging and the activation of the ohmic load 30, particularly the sheet heating element 40, the energy store 20 in the form of the cell is also discharged.

Impedance-based control, in the event of fast charging, is superimposed by a thermal downrating of current, in order to ensure that a given temperature limit in the cells is not exceeded. Moreover, as a function of the cell voltage, the value of a maximum or peak current is defined.

As a load, alternatively to an exclusively ohmic load, a second energy store 60 can be provided in the working device 1 or in the vehicle 1', in order to generate discharge pulses. In this case, the energy stores 20, 20' and 60 are connected to one another by means of a DC/DC coupling 70.

On the grounds that, for example, an ohmic load 30 in the form of a sheet heating element 40 internally or externally to a cell to be charged is employed as a load for the generation of high-frequency discharge pulses during charging, impedance-controlled fast charging is also possible on a charging column and on all charging units 80 which do not have a facility for the delivery of appropriate discharge pulses.

Discharge pulses moreover provide the following advantages:

The charging of a double layer of electrodes can be avoided.
There is no resulting region which is limited by diffusion.
A lower effective resistance results in reduced waste heat.
The anode potential can remain at a higher level.
According to the invention, there is a reduced risk of plating with respect to metallic lithium.
In consequence, the service life of the energy store is extended.
Additionally, shorter charging times can be achieved.
Higher charging capacities are also possible.

By means of the current flux via the sheet heating element 40 or, in general, by means of the ohmic resistance of the ohmic load 30, the cell—described in summary as the energy store 20—additionally undergoes heat-up. This is conducive to fast charging, and additionally improves service life, restricts the limited risk of plating with respect to metallic lithium, and reduces resistance, particularly in conjunction with an increase in the anode potential.

Impedance-controlled fast charging according to the invention can be effectively regulated and operated such that, in the event of high cell voltages, the current is reduced or the anode potential never falls to an excessively low level such that, additionally, plating is prevented.

LIST OF REFERENCE SYMBOLS

1 Working device
1' Vehicle
10 Control unit
20 Energy store, store for electrical energy 20' Vehicle energy store
21 Housing
22 Electrode arrangement/stack
23 Terminal
24 Terminal
30 Ohmic load
40 Heating device
50 Generator
60 (Further) energy store
70 DC/DC coupling
80 Charging unit
90 Graph
91 x-axis
91-1 High charging phase
91-2 Transitional charging phase
91-3 Low charging phase
92 y-axis
92-1 Charging regime
92-2 Discharging regime
93 Trace
93-1 Charging segment, charging pulse
93-1 Discharge segment, discharge pulse
100 Charging system

What is claimed is:

1. A method for impedance-controlled fast charging of a stored electrical energy source, the method comprising:
    detecting a variable characteristic of an impedance of the stored electrical energy source;
    setting a present charging current for charging the stored electrical energy source as a function of the variable characteristic of the impedance;
    temporarily reducing the present charging current with a steep edge by temporarily connecting a resistive load to the stored electrical energy source and feeding said resistive load using said stored electrical energy source; and
    detecting a voltage response of the stored electrical energy source to the steep edge as the variable characteristic of the impedance of the stored electrical energy source and using the voltage response as a basis for setting the present charging current.

2. The method according to claim 1, wherein the stored electrical energy source is a vehicle energy store and the working device is a vehicle.

3. The method according to claim 1, wherein a heater is employed as the resistive load and, for the reduction of the present charging current, is connected to the stored electrical energy source for operation of the heater.

4. The method according to claim 3, wherein the heater is a dedicated heater for the stored electrical energy source.

5. The method according to claim 4, wherein the heater is a battery-specific or cell-specific heater employed on or in the stored electrical energy source.

6. The method according to claim 5, wherein the heater is configured as a sheet heating element.

7. The method according to claim 1, wherein by way of the resistive load, a generator or electrical machine of the working device is employed in an active short-circuit state.

8. The method according to claim 1, wherein by way of the resistive load, a further energy store to be charged is employed in a DC/DC coupling arrangement with the stored electrical energy source.

9. The method according to claim 1, wherein charging of the stored electrical energy source is controlled or regulated:
    locally and/or decentrally for the stored electrical energy source, or
    centrally and in combination with the stored electrical energy source for a plurality of energy stores.

10. The method according to claim 1, wherein the charging of a plurality of energy stores is controlled or regulated, wherein:
    detection of a voltage response of a fundamental or respective energy store is executed locally and/or decentrally,
    an evaluation and/or appraisal of the voltage responses of a plurality of energy stores is executed centrally, and/or
    a common charging strategy is selected for a plurality of energy stores on the basis of an energy store having a lowest impedance of all the energy stores.

11. The method according to claim 1, wherein the temporary reduction of the present charging current is executed:
    for diagnostic purposes, at a frequency within a range of approximately 0.1 Hz to approximately 10 Hz, in the manner of a discharge pulse, having a pulse duration in a low-frequency component with a length of approximately 1 second, having a discharge time of 5 ms, having a control response to a decaying charging current of 995 ms, and/or having a pulse duration in the high-frequency component within the range of approximately 5 ms to approximately 10 ms; and/or
    for standardized intercalation, at a frequency within a range of approximately 50 Hz to approximately 200 Hz and/or at a scanning rate of 10%.

12. A control unit for a charging system, comprising:
    a control chip and/or an ASIC arranged on or in a stored electrical energy source centrally or decentrally for one or more stored electrical energy sources,
    wherein the control unit is operatively configured to carry out the acts of:
    detecting a variable characteristic of an impedance of the stored electrical energy source;
    setting a present charging current for charging the stored electrical energy source as a function of the variable characteristic of the impedance;
    temporarily reducing the present charging current with a steep edge by temporarily connecting a resistive load to the stored electrical energy source and feeding said resistive load using said stored electrical energy source; and
    detecting a voltage response of the stored electrical energy source to the steep edge as the variable characteristic of the impedance of the stored electrical energy source and using the voltage response as a basis for setting the present charging current.

13. A charging system for impedance-controlled fast charging, the system comprising:
    a stored electrical energy source of a working device; and
    a control unit according to claim 12.

14. The charging system according to claim 13, wherein the stored electrical energy source is a vehicle energy store and the working device is a vehicle.

15. A working device, comprising:
    a stored electrical energy source; and
    a control unit according to claim 12, wherein
    the control unit is separate from or incorporated in the stored electrical energy source.

16. The working device according to claim 15, wherein the working device is a vehicle and the stored electrical energy source is a vehicle energy store.

\* \* \* \* \*